(12) United States Patent
NarasimhaMurthy et al.

(10) Patent No.: US 12,579,432 B2
(45) Date of Patent: Mar. 17, 2026

(54) METHODS AND APPARATUS FOR AUTOMATED SPECIMEN CHARACTERIZATION USING DIAGNOSTIC ANALYSIS SYSTEM WITH CONTINUOUS PERFORMANCE BASED TRAINING

(71) Applicant: Siemens Healthcare Diagnostics Inc., Tarrytown, NY (US)

(72) Inventors: Venkatesh NarasimhaMurthy, Hillsborough, NJ (US); Vivek Singh, Princeton, NJ (US); Yao-Jen Chang, Princeton, NJ (US); Benjamin S. Pollack, Jersey City, NJ (US); Ankur Kapoor, Plainsboro, NJ (US); Rayal Raj Prasad Nalam Venkat, Princeton, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 453 days.

(21) Appl. No.: 17/755,465

(22) PCT Filed: Oct. 22, 2020

(86) PCT No.: PCT/US2020/056919
§ 371 (c)(1),
(2) Date: Apr. 29, 2022

(87) PCT Pub. No.: WO2021/086720
PCT Pub. Date: May 6, 2021

(65) Prior Publication Data
US 2024/0169517 A1 May 23, 2024

Related U.S. Application Data

(60) Provisional application No. 62/929,063, filed on Oct. 31, 2019.

(51) Int. Cl.
*G06N 3/08* (2023.01)
*G01N 35/00* (2006.01)
(Continued)

(52) U.S. Cl.
CPC ......... *G06N 3/08* (2013.01); *G01N 35/00613* (2013.01); *G06F 18/2431* (2023.01);
(Continued)

(58) Field of Classification Search
CPC .... G06N 3/08; G06N 3/045; G01N 35/00613; G06F 18/2431; G06F 18/2414;
(Continued)

(56) References Cited

U.S. PATENT DOCUMENTS 9,322,761 B2 4/2016 Miller
9,739,783 B1 8/2017 Kumar et al.
(Continued)

FOREIGN PATENT DOCUMENTS

CN 105825509 A 8/2016
CN 106372390 A 2/2017
(Continued)

OTHER PUBLICATIONS

Machine translation for CN 109492675 (Year: 2018).*
(Continued)

*Primary Examiner* — Qian Yang

(57) ABSTRACT

A method of characterizing a specimen to be analyzed in an automated diagnostic analysis system provides a segmentation determination and/or an HILN (hemolysis, icterus, lipemia, normal) determination of the specimen while providing characterization training updates based on the accuracy and/or confidence in the determinations. The method includes identifying an incorrect or low confidence segmentation or HILN determination, forwarding the incorrect or low confidence determination from the HILN network to a
(Continued)

database, and providing one or more training images to the HILN network based on the incorrect or low confidence determination. Quality check modules and systems configured to carry out the method are also described, as are other aspects.

20 Claims, 5 Drawing Sheets

(51) Int. Cl.

| | | |
|---|---|---|
| *G06F 18/2431* | (2023.01) | |
| *G06T 7/00* | (2017.01) | |
| *G06V 10/82* | (2022.01) | |
| *G06V 20/69* | (2022.01) | |

(52) U.S. Cl.
CPC ............ *G06T 7/0012* (2013.01); *G06V 10/82* (2022.01); *G06V 20/695* (2022.01); *G06T 2207/20081* (2013.01)

(58) Field of Classification Search
CPC ........ G06T 7/0012; G06T 2207/20081; G06V 10/82; G06V 20/695; G06V 2201/06
See application file for complete search history.

(56) References Cited

U.S. PATENT DOCUMENTS

| | | | |
|---|---|---|---|
| 10,198,832 B2 | 2/2019 | De Fauw et al. | |
| 2003/0130985 A1* | 7/2003 | Driesen ................... | G06F 16/20 |
| 2017/0364771 A1 | 12/2017 | Pinheiro et al. | |
| 2017/0372193 A1 | 12/2017 | Mailhe et al. | |
| 2018/0096221 A1 | 4/2018 | Stathacopoulos et al. | |
| 2019/0041318 A1 | 2/2019 | Wissmann et al. | |
| 2019/0096060 A1 | 3/2019 | Zhang et al. | |
| 2019/0220967 A1* | 7/2019 | Bhatt ................... | G06T 7/0002 |
| 2019/0271714 A1 | 9/2019 | Kluckner et al. | |
| 2019/0279760 A1 | 9/2019 | Yao et al. | |
| 2019/0392505 A1* | 12/2019 | Amemura ............ | G06V 30/224 |
| 2020/0160975 A1* | 5/2020 | Yao ....................... | G06V 10/764 |
| 2021/0064927 A1 | 3/2021 | Kluckner et al. | |
| 2021/0133971 A1 | 5/2021 | Ma et al. | |
| 2021/0164965 A1 | 6/2021 | Ma et al. | |
| 2021/0334972 A1 | 10/2021 | NarasimhaMurthy et al. | |

FOREIGN PATENT DOCUMENTS

| | | | |
|---|---|---|---|
| CN | 106408562 A | 2/2017 | |
| CN | 108139320 A | 6/2018 | |
| CN | 108596166 A | 9/2018 | |
| CN | 109492675 | * 10/2018 | |
| EP | 3018482 A1 | 5/2016 | |
| JP | 2004-195213 A | 7/2004 | |
| JP | 2019-500585 A | 1/2019 | |
| JP | 2019500100 A | 1/2019 | |
| WO | 2017102827 A1 | 6/2017 | |
| WO | 2017106645 A1 | 6/2017 | |
| WO | 2017132168 A1 | 8/2017 | |
| WO | 2017132169 A1 | 8/2017 | |
| WO | 2018009405 A1 | 1/2018 | |
| WO | 2018039380 A1 | 3/2018 | |
| WO | 2018/089938 A1 | 5/2018 | |
| WO | 2018105062 A1 | 6/2018 | |
| WO | 2018/188023 A1 | 10/2018 | |
| WO | 2018/191287 A1 | 10/2018 | |

OTHER PUBLICATIONS

Extended EP Search Report dated Nov. 28, 2022 of corresponding European Application No. 20880598.6, 4 Pages.
PCT International Search Report and Written Opinion dated Jan. 19, 2021 (10 Pages).
Goodfellow, Ian, et al. "Generative adversarial nets." Advances in neural information processing systems 27 (2014) pp. 1-9.
Hideki, Aso et al. "Deep Representation Learning by Multi-Layer Neural Networks"; The Japanese Society for Artificial Intelligence; Year: Jul. 2013, vol. 28 No. 4, pp. 649-659.
Huang, Gao, et al. "Densely connected convolutional networks", Proceedings of the IEEE conference on computer vision and pattern recognition. 2017. pp. 4700-4708.
Jegou, Simon, et al. "The one hundred layers tiramisu: Fully convolutional densenets for semantic segmentation." Proceedings of the IEEE conference on computer vision and pattern recognition workshops. 2017.
Lecun, Yann et al. "Gradient-based learning applied to document recognition" Proceedings of the IEEE, New York, US, vol. 86, No. 11, Nov. 1, 1998, pp. 2278-2323, 1998 // ISSN: 0018-9219, DOI: 10.1109/5.726791.
Ren, Shaoqing et al: "Faster R-CNN: Towards Real-Time Object Detection with Region Proposal Networks"; IEEE Transactions On Pattern Analysis and Machine Intelligence; vol. 39, No. 6, Sep. 13, 2015; pp. 1137-1149; XP055473561; USA; ISSN:0162-8828; DOI: 10.1109/TPAMI.2016.2577031.
Shah Urmil et al: "A Review of Deep Learning Models for Computer Vision", 2018 IEEE Punecon, IEEE, Nov. 30, 2018 (Nov. 30, 2018), pp. 1-6, XP033568970, DOI: 10.1109/PUNECON.2018.8745417.

* cited by examiner

METHODS AND APPARATUS FOR AUTOMATED SPECIMEN CHARACTERIZATION USING DIAGNOSTIC ANALYSIS SYSTEM WITH CONTINUOUS PERFORMANCE BASED TRAINING

CROSS REFERENCE TO RELATED APPLICATION APPLICATIONS

This disclosure is a 371 of PCT/US2020/056919, filed Oct. 22, 2020, which claims priority to and the benefit of U.S. Provisional Patent Application No. 62/929,063, entitled "METHODS AND APPARATUS FOR CHARACTERIZING A SPECIMEN IN AN AUTOMATED DIAGNOSTIC ANALYSIS SYSTEM WHILE CONTINUOUSLY PROVIDING TRAINING UPDATES BASED ON CHARACTERIZATION PERFORMANCE," filed Oct. 31, 2019, the disclosures of which are hereby incorporated by reference in their entireties for all purposes herein.

FIELD

This disclosure relates to methods and apparatus for characterizing a specimen in an automated diagnostic analysis system.

BACKGROUND

Automated diagnostic analysis systems may analyze a specimen, such as, e.g., urine, blood serum, blood plasma, interstitial liquid, cerebrospinal liquid, and the like, to identify an analyte or other constituent in the specimen. Such specimens are usually contained within specimen containers (e.g., specimen collection tubes) that can be transported via automated tracks to various imaging, pre-processing, pre-screening, and analyzer stations within an automated diagnostic analysis system.

A specimen may be pre-processed with one or more reagents and possibly other materials added therein, and then analyzed at one or more analyzer stations. Analytical measurements may be performed on the specimen via luminescence or photometric readings, or fluorometric absorption or emission readings, such as by using a beam of interrogating radiation or the like. The analytical measurements allow determination of an amount of an analyte or other constituent in the specimen using well-known techniques.

However, the presence of an interferent (e.g., hemolysis, icterus, and/or lipemia) in the specimen, which may result from a patient condition or sample pre-processing, may adversely affect test results of the analyte or constituent measurement obtained from one or more analyzers. For example, the presence of hemolysis (H) in the specimen, which may be unrelated to a patient's disease state, may cause a different interpretation of the disease condition of the patient. Similarly, the presence of icterus (I) and/or lipemia (L) in the specimen may also cause a different interpretation of the disease condition of the patient.

A pre-screening process for characterizing a specimen may thus be performed in an automated diagnostic analysis system. Characterization of a specimen may include a segmentation determination, which may identify various regions of the specimen container and specimen. Characterization of a specimen may also include an HILN determination; that is, determining a presence and optionally a degree of an interferent, such as H, I, and/or L, in a specimen to be analyzed or determining that the specimen is normal (N) and can be further processed. This pre-screening process may be based on one or more images of a specimen in a specimen container captured at one or more imaging stations of the automated diagnostic analysis system. The performance of the pre-screening process (i.e., the accuracy of the segmentation and/or HILN determination) may be based on a set of training images of specimens and specimen containers used to "train" the pre-screening process in order to appropriately characterize specimens and specimen containers. The set of training images is intended to include a variety of different specimen containers and specimen amounts and appearances (e.g., normal and with varying degrees of each interferent) expected to be received in the automated diagnostic analysis system.

SUMMARY

According to a first aspect, a method of characterizing a specimen in an automated diagnostic analysis system is provided. The method includes performing a segmentation or an HILN (hemolytic, icteric, lipemic, normal) determination on a captured image of the specimen in a specimen container via an HILN network of a quality check module in the automated diagnostic analysis system, identifying an incorrect or low confidence determination, forwarding the incorrect or low confidence determination from the HILN network to a database, and providing one or more training images to the HILN network based on the incorrect or low confidence determination.

According to another aspect, a quality check module is provided. The quality check module includes a plurality of image capture devices arranged around an imaging location configured to capture multiple images from multiple viewpoints of a specimen container, and a computer coupled to the plurality of image capture devices. The computer is configured and operative via programming instructions to perform a segmentation or an HILN (hemolytic, icteric, lipemic, normal) determination on a captured image of a specimen in the specimen container via an HILN network of the quality check module, wherein the captured image is taken by one of the plurality of image capture devices and the HILN network is executing on the computer. The computer is configured and operative via programming instructions to identify an incorrect or low confidence determination, forward the incorrect or low confidence determination from the HILN network to a database, and provide one or more training images to the HILN network based on the incorrect or low confidence determination.

Still other aspects, features, and advantages of this disclosure may be readily apparent from the following description and illustration of a number of example embodiments and implementations, including the best mode contemplated for carrying out the invention. This disclosure may also be capable of other and different embodiments, and its several details may be modified in various respects, all without departing from the scope of the invention. This disclosure is intended to cover all modifications, equivalents, and alternatives falling within the scope of the claims.

BRIEF DESCRIPTION OF THE DRAWINGS

The drawings, described below, are for illustrative purposes and are not necessarily drawn to scale. Accordingly, the drawings and descriptions are to be regarded as illustrative in nature, and not as restrictive. The drawings are not intended to limit the scope of the invention in any way.

DETAILED DESCRIPTION

Figure 1:
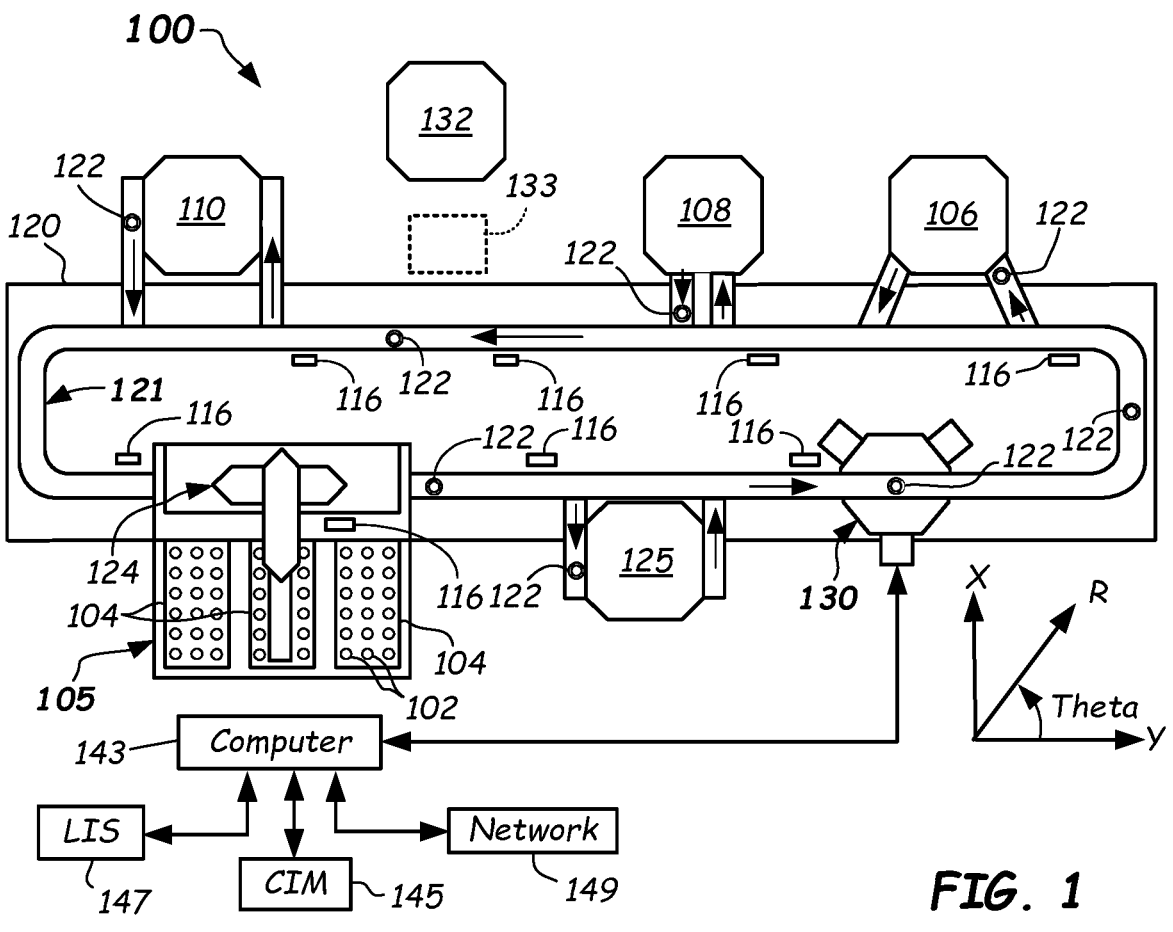
FIG. 1 illustrates a top schematic view of an automated diagnostic analysis system including one or more quality check modules configured to carry out segmentation and/or HILN (hemolytic, icteric, lipemic, normal) determination methods according to one or more embodiments.

As stated above, the set of training images is intended to include a variety of different specimen containers and specimen sizes and appearances (e.g., normal and with varying degrees of each interferent) expected in specimens to be analyzed. However, the set of training images may not include every variation of a specimen container and/or a specimen appearance received in an automated diagnostic analysis system, and/or the sizes, types, and characteristics of specimen containers may change over time, resulting in incorrect or low confidence specimen characterizations.

Accordingly, there is an unmet need to provide methods and apparatus to characterize a specimen in a specimen container in an automated diagnostic analysis system that can be continuously updated, such as with new training images.

Pre-screening of a specimen contained in a specimen container may be performed automatically at one or more quality check modules of an automated diagnostic analysis system. Pre-screening may include capturing, at an imaging station, one or more images of the specimen contained in the specimen container and performing segmentation and/or HILN (hemolytic, icteric, lipemic, normal) determination, and both in most cases, on the captured images. The segmentation determination may identify various regions (areas) in the image of the specimen container and specimen, such as, e.g., a serum or plasma portion, a settled blood portion, a gel separator (if used), an air region, one or more label regions, a type of specimen container (indicating, e.g., height and width or diameter), and/or a type and/or color of a specimen container cap. The HILN determination may determine the presence of and, in some embodiments, the degree of an interferent in the serum or plasma portion of a blood specimen, or whether the specimen is normal (N), which indicates that the specimen includes either an acceptably low amount of an interferent or substantially none at all.

The interferent may be hemolysis (H), icterus (I), or lipemia (L). Hemolysis may be defined as a condition in the serum or plasma portion wherein red blood cells are destroyed during pre-processing, which leads to the release of hemoglobin from the red blood cells into the serum or plasma portion such that the serum or plasma portion takes on a reddish hue. The degree of hemolysis may be quantified by assigning a hemolytic index (e.g., H0-H6 in some embodiments and more or less in other embodiments). Icterus may be defined as a condition of the blood where the serum or plasma portion is discolored dark yellow, which may be caused by an accumulation of bile pigment (bilirubin). The degree of icterus may be quantified by assigning an icteric index (e.g., I0-I6 in some embodiments and more or less in other embodiments). Lipemia may be defined as a presence in the blood of an abnormally high concentration of emulsified fat, such that the serum or plasma portion has a whitish or milky appearance. The degree of lipemia may be quantified by assigning a lipemic index (e.g., L0-L4 in some embodiments and more or less in other embodiments). In some embodiments, the pre-screening process may include determination of an un-centrifuged (U) class for a serum or plasma portion of a specimen that has not been centrifuged.

A quality check module of an automated diagnostic analysis system configured to execute a pre-screening characterization method may include an HILN network implemented via programming instructions executable on a computer of the quality check module. The HILN network may be or include, e.g., a segmentation convolutional neural network (SCNN), that receives as input one or more captured images of fractionated specimens contained in specimen containers. The SCNN may include, in some embodiments, greater than 100 operational layers including, e.g., BatchNorm, ReLU activation, convolution (e.g., 2D), dropout, and deconvolution (e.g., 2D) layers to extract features, such as simple edges, texture, and parts of the serum or plasma portion and label-containing regions. Top layers, such as fully convolutional layers, may be used to provide correlation between parts. The output of the layer may be fed to a SoftMax layer, which produces an output on a per pixel (or per superpixel (patch)—including nxn pixels) basis concerning whether each pixel or patch includes HILN. In some embodiments, only an output of HILN may be provided by the SCNN. In other embodiments, the output of the SCNN may include multiple classes of HILN, such as greater than 20 classes of HILN, so that for each interferent present, an estimate of the level (index) of the interferent can also obtained. Other numbers of classes of each of HIL may be included in the SCNN. The SCNN may also include a front-end container segmentation network (CSN) to determine a container type and a container boundary. More particularly, the CSN may classify (or "segment") various regions (areas) of the specimen container and specimen image such as a serum or plasma portion, settled blood portion, gel separator (if used), air region, one or more label regions, type of specimen container (indicating, e.g., height and width/diameter), and/or type and/or color of a specimen container cap. A specimen container holder or background (part of the image surrounding the specimen container) may also be classified. Alternatively, other types of HILN networks may be used in a quality check module.

Should the specimen be found to contain one or more of H, I, and L, a suitable notice may be provided to the operator, and/or the specimen container may be taken off line (1) to perform a remediation to rectify the one or more of the H, I, or L, (2) to redraw the specimen, or (3) to perform other processing. Thus, the ability to pre-screen for HILN before analysis by one or more analyzers may advantageously (a) minimize time wasted analyzing specimens that are not of the proper quality for analysis, (b) avoid or minimize erroneous test results, (c) minimize patient test result delay, and/or (d) avoid wasting of patient specimen. Incorrect or low confidence sample specimen determinations may be stored in a local database or in a cloud-based system along with annotations.

Prior to performing a pre-screening process, an HILN network is "trained" to characterize specimens in specimen containers with a set of training images that depict specimens in specimen containers. The set of training images is intended to include a variety of different specimen containers of different sizes and type and differing specimen appearances (e.g., normal and with varying degrees of each interferent and provided in differing amounts) expected to be received in an automated diagnostic analysis system in later specimen characterizations. In order to optimize system performance, a set of training images may be customized to a particular automated diagnostic analysis system based on, e.g., the system's geographical location and operation size (e.g., whether a low, medium, or high volume system). The content of training images sets may therefore vary somewhat from system to system. Further, training is very time intensive, so supplying extremely high numbers of training images and annotations thereof can be cost prohibitive. Accordingly, a set of training images for a particular system may not include every variation of a specimen container and/or every variation of specimen appearance that may be encountered by that system. Also, the types and characteristics of specimen containers (e.g., sizes, glass or plastic materials used, cap type and color, container label sizes and locations thereof, etc.) may change over time. Accordingly, some specimen characterizations may be incorrect or deemed to be of low confidence by the HILN network (incorrect characterizations may be determined using any suitable technique, and characterization confidence levels may be provided by an HILN network using any suitable algorithm or technique).

An HILN network in accordance with one or more embodiments can provide continuous training updates that may be automatically incorporated into the HILN network via retraining on a frequent or regular basis, such as, e.g., upon meeting or exceeding a threshold number of incorrect or low confidence specimen characterizations. Other criteria may be used to automatically incorporate training updates into an HILN network. Additionally or alternatively, training updates may be incorporated into an HILN network by a user at the user's discretion. Any suitable criteria may be used to automatically incorporate training updates into the HILN network, and updates may be provided at any suitable time period or interval.

In some embodiments, an initial set of training images may be compiled by operating a newly-installed automated diagnostic analysis system for a given period of time (e.g., one or two weeks). Captured image data of specimens received in the newly-installed system may be forwarded to a database/server (which may be local and/or a part of the newly-installed system or it may be a cloud-based server). The image data may be annotated (e.g., annotated manually and/or annotations generated automatically) to create the initial set of training images. The set of training images may then be used to initially train an HILN network of a quality check module of the automated diagnostic analysis system.

In some embodiments, specimens having characterizations performed by the HILN network that are determined to be incorrect or low confidence may not be automatically forwarded to an analyzer of the automated diagnostic analysis system, but may be set aside for further review. Furthermore, the images of specimen characterizations determined to be incorrect or low confidence and other related data, may be forwarded (and encrypted in some embodiments) to the database/server, wherein training updates (e.g., additional training images) based on the incorrect or low confidence characterizations are generated and stored. In some embodiments, the training updates may be based on manual annotations and/or automatically-generated annotations of the received images of specimen characterizations determined to be incorrect or have low confidence. The training updates may be forwarded to the HILN network for incorporation therein via retraining. In some embodiments, a report or prompt of the availability of one or more training updates may be provided to a user to allow the user to decide when and if to receive and/or incorporate the one or more training updates in the HILN network.

In some embodiments, the initial set of training images and/or the training updates, each of which is software based, may be provided to an automated diagnostic analysis system (and the HILN network in particular) as a retrained model via the Internet or a physical media (e.g., a storage device containing programming instructions and data).

Further details of inventive characterization methods, quality check modules configured to carry out the inventive characterization methods, and automated diagnostic analysis systems including one or more quality check modules with training update capability will be further described with reference to FIGS. 1-6 herein.

Figure 2:
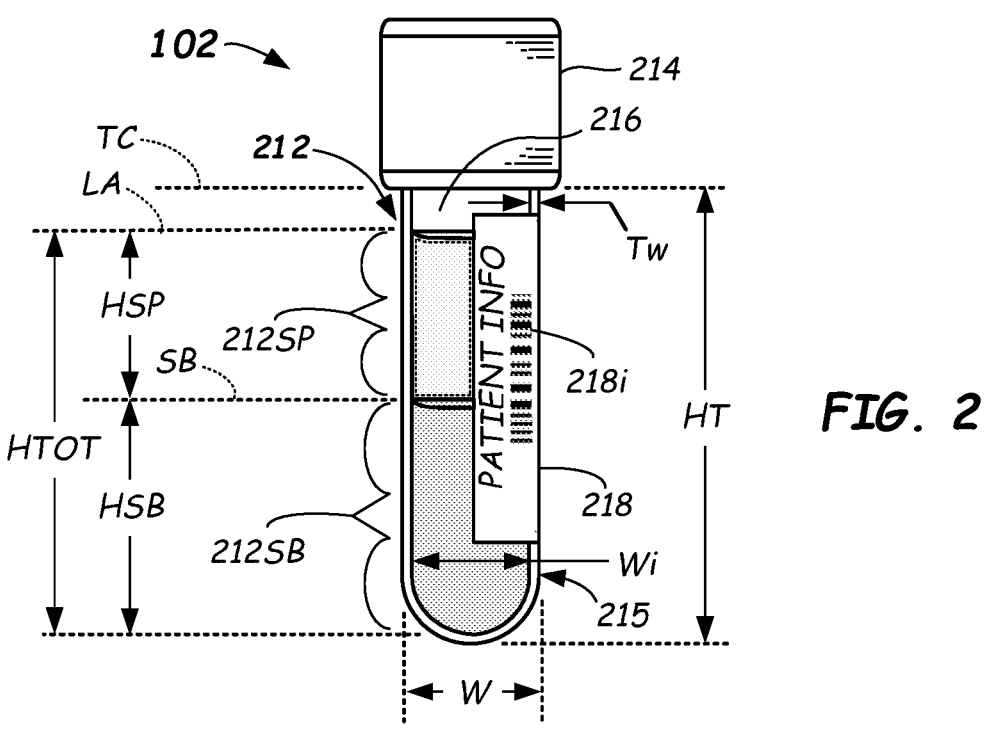
FIG. 2 illustrates a side view of a specimen container including a separated specimen with a serum or plasma portion that may contain an interferent.
Figure 3:
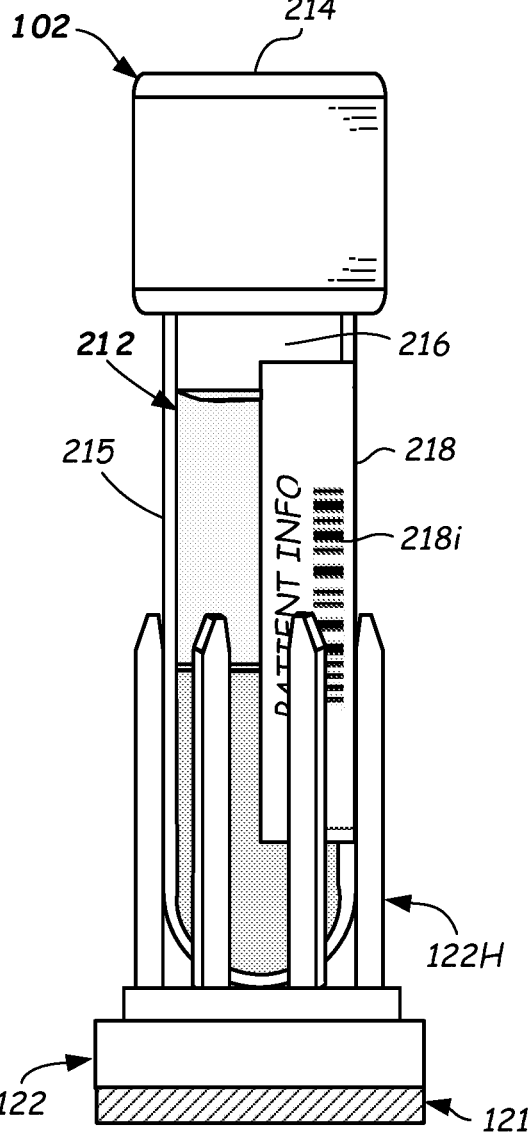
FIG. 3 illustrates a side view of the specimen container of FIG. 2 held in an upright orientation in a holder that can be transported within the automated diagnostic analysis system of FIG. 1.

FIG. 1 illustrates an automated diagnostic analysis system 100 capable of automatically processing multiple specimen containers 102 containing specimens 212 (see FIG. 2). The specimen containers 102 may be provided in one or more racks 104 at a loading area 105 prior to transportation to, and analysis by, one or more analyzers (e.g., first analyzer 106, second analyzer 108, and/or third analyzer 110) arranged about the automated diagnostic analysis system 100. More or less numbers of analyzers may be used in the system 100. The analyzers may be any combination of any number of clinical chemistry analyzers, assaying instruments, and/or the like. The term "analyzer" as used herein means a device used to analyze for chemistry or to assay for the presence of, amount, or functional activity of a target entity (the analyte), such as DNA or RNA, for example. Analytes commonly tested for in clinical chemistry analyzers include enzymes, substrates, electrolytes, specific proteins, drugs of abuse, and therapeutic drugs. The specimen containers 102 may be any suitably transparent or translucent container, such as a blood collection tube, test tube, sample cup, cuvette, or other clear or opaque glass or plastic container capable of containing and allowing imaging of the specimen 212 contained therein. The specimen containers 102 may be varied in size and may have different cap colors and/or cap types.

Specimens 212 (see FIG. 2) may be provided to the automated diagnostic analysis system 100 in the specimen containers 102, which may be capped with a cap 214. The caps 214 may be of different types and/or colors (e.g., red, royal blue, light blue, green, grey, tan, yellow, or color combinations), which may have meaning in terms of what test the specimen container 102 is used for, the type of additive included therein, whether the container includes a gel separator, or the like. Other colors may be used. In one embodiment, the cap type may be determined by a characterization method described herein. Cap type may be used to determine if the specimen 212 is provided under a vacuum and/or the type of additive therein, for example.

Each of the specimen containers 102 may be provided with one or more labels 218 that may include identification information 218i (i.e., indicia) thereon, such as a barcode, alphabetic characters, numeric characters, or combinations thereof. The identification information 218i may include or be associated to (e.g., through an Laboratory Information System (LIS) 147 database), e.g., patient information (e.g., name, date of birth, address, and/or other personal information), tests to be performed, time and date specimen obtained, medical facility information, tracking and routing information, etc. Other information may also be included. The identification information 218i may be machine readable at various locations about the automated diagnostic analysis system 100. The machine readable information may be darker (e.g., black) than the label material (e.g., white paper) so that it can be readily imaged. The identification information 218i may indicate, or may otherwise be correlated, via the LIS 147 or other test ordering system, to a patient's identification as well as tests to be performed on the specimen 212. Such identification information 218i may be provided on the label 218, which may be adhered to or otherwise provided on an outside surface of the tube 215. As shown in FIG. 2, the label 218 may not extend all the way around the specimen container 102 or all along a length of the specimen container 102 such that from the particular lateral front viewpoint shown, some or a large part of a serum or plasma portion 212SP is viewable (the part shown as dotted) and unobstructed by the label 218.

The specimen 212 may include the serum or plasma portion 212SP and a settled blood portion 212SB contained within the tube 215. Air 216 may be provided above the serum and plasma portion 212SP and a line of demarcation between them is defined as the liquid-air interface (LA). The line of demarcation between the serum or plasma portion 212SP and the settled blood portion 212SB is defined as a serum-blood interface (SB). An interface between the air 216 and cap 214 is defined as a tube-cap interface (TC). The height of the tube (HT) is defined as a height from a bottom-most part of the tube 215 to a bottom of the cap 214, and may be used for determining tube size (tube height). A height of the serum or plasma portion 212SP is HSP and is defined as a height from a top of the serum or plasma portion 212SP at LA to a top of the settled blood portion 212SB at SB. A height of the settled blood portion 212SB is HSB and is defined as a height from the bottom of the settled blood portion 212SB to a top of the settled blood portion 212SB at SB. HTOT is a total height of the specimen 212 and equals HSP plus HSB.

In more detail, automated diagnostic analysis system 100 may include a base 120 (FIG. 1) (e.g., a frame, floor, or other structure) upon which a track 121 may be mounted. The track 121 may be a railed track (e.g., a mono rail ora multiple rail), a collection of conveyor belts, conveyor chains, moveable platforms, or any other suitable type of conveyance mechanism. Track 121 may be circular or any other suitable shape and may be a closed track (e.g., endless track) in some embodiments. Track 121 may, in operation, transport individual ones of the specimen containers 102 to various locations spaced about the track 121 in carriers 122.

Carriers 122 may be passive, non-motored pucks that may be configured to carry a single specimen container 102 on the track 121, or optionally, an automated carrier including an onboard drive motor, such as a linear motor that is programmed to move about the track 121 and stop at pre-programmed locations. Other configurations of carrier 122 may be used. Carriers 122 may each include a holder 122H (see FIG. 3) configured to hold the specimen container 102 in a defined upright position and orientation. The holder 122H may include a plurality of fingers or leaf springs that secure the specimen container 102 on the carrier 122, but some may be moveable or flexible to accommodate different sizes (widths) of the specimen containers 102. In some embodiments, carriers 122 may leave from the loading area 105 after being offloaded from the one or more racks 104. The loading area 105 may serve a dual function of also allowing reloading of the specimen containers 102 from the carriers 122 to the loading area 105 after pre-screening and/or analysis is complete.

A robot 124 may be provided at the loading area 105 and may be configured to grasp the specimen containers 102 from the one or more racks 104 and load the specimen containers 102 onto the carriers 122, such as onto an input lane of the track 121. Robot 124 may also be configured to reload specimen containers 102 from the carriers 122 to the one or more racks 104. The robot 124 may include one or more (e.g., at least two) robot arms or components capable of X (lateral) and Z (vertical—out of the page, as shown), Y and Z, X, Y, and Z, or r (radial) and theta (rotational) motion. Robot 124 may be a gantry robot, an articulated robot, an R-theta robot, or other suitable robot wherein the robot 124 may be equipped with robotic gripper fingers oriented, sized, and configured to pick up and place the specimen containers 102.

Upon being loaded onto track 121, the specimen containers 102 carried by carriers 122 may progress to a first pre-processing station 125. For example, the first pre-processing station 125 may be an automated centrifuge configured to carry out fractionation of the specimen 212. Carriers 122 carrying specimen containers 102 may be diverted to the first pre-processing station 125 by inflow lane or suitable robot. After being centrifuged, the specimen containers 102 may exit on an outflow lane, or otherwise be removed by a robot, and continue along the track 121. In the depicted embodiment, the specimen container 102 in carrier 122 may next be transported to a quality check module 130 that is configured to carry out pre-screening, as will be further described herein.

The quality check module 130 is configured to pre-screen and carry out the one or more of the characterization methods described herein, such as to automatically determine a presence of, and optionally an extent or degree of H, I, and/or L contained in a specimen 212 or whether the specimen is normal (N). If found to contain effectively-low amounts of H, I and/or L, so as to be considered normal (N), the specimen 212 may continue on the track 121 and then may be analyzed by the one or more analyzers (e.g., first, second, and/or third analyzers 106, 108, and/or 110). Other pre-processing operations may be conducted on the specimens 212 and/or specimen containers 102. After analysis by the one or more analyzers (e.g., first, second, and/or third analyzers 106, 108, and/or 110), the specimen container 102 may be returned to the loading area 105 for reloading to the one or more racks 104 or otherwise offloaded.

In some embodiments, in addition to detection of HILN, segmentation of the specimen container 102 and specimen 212 may take place. From the segmentation data, post processing may be used for quantification of the specimen 212 (i.e., determination of HSP, HSB, HTOT, and/or possibly a determination of location of SB, LA and/or TC). In some embodiments, characterization of the physical attributes (e.g., size—height and width (or diameter)) of the specimen container 102 may take place at the quality check module 130. Such characterization may include determining HT and W, and possibly TC, and/or Wi. From this characterization, the size of the specimen container 102 may be extracted. Moreover, in some embodiments, the quality check module 130 may also determine cap type, which may be used as a safety check and may catch whether a wrong tube type has been used for the test or tests ordered.

In some embodiments, a remote station 132 may be provided on the automated diagnostic analysis system 100 that is not directly linked to the track 121. For instance, an independent robot 133 (shown dotted) may carry specimen containers 102 containing specimens 212 to the remote station 132 and return them after testing/pre-processing. Optionally, the specimen containers 102 may be manually removed and returned. Remote station 132 may be used to test for certain constituents, such as a hemolysis level, or may be used for further processing, such as to lower a lipemia level through one or more additions and/or through additional processing, or to remove a clot, bubble, or foam, is identified in the characterization at quality check module 130, for example. Other pre-screening using the HILN detection methods described herein may optionally be accomplished at remote station 132.

Additional station(s) may be provided at one or more locations on or along the track 121. The additional station(s) may include a de-capping station, aliquoting station, one or more additional quality check modules 130, and the like.

The automated diagnostic analysis system 100 may include a number of sensors 116 at one or more locations around the track 121. Sensors 116 may be used to detect locations of specimen containers 102 on the track 121 by means of reading the identification information 218*i*, or like information (not shown) provided on each carrier 122. Any suitable means for tracking the location may be used, such as proximity sensors. All of the sensors 116 may interface with a computer 143, so that the location of each specimen container 102 along the track 121 may be known at all times.

The pre-processing stations and the analyzers 106, 108, and 110 may be equipped with robotic mechanisms and/or inflow lanes configured to remove carriers 122 from the track 121, and with robotic mechanisms and/or outflow lanes configured to reenter carriers 122 to the track 121.

Automated diagnostic analysis system 100 may be controlled by the computer 143, which may be a microprocessor-based central processing unit CPU, having a suitable memory and suitable conditioning electronics and drivers for operating the various system components. Computer 143 may be housed as part of, or separate from, the base 120 of the automated diagnostic analysis system 100. The computer 143 may operate to control movement of the carriers 122 to and from the loading area 105, motion about the track 121, motion to and from the first pre-processing station 125 as well as operation of the first pre-processing station 125 (e.g., centrifuge), motion to and from the quality check module 130 as well as operation of the quality check module 130, and motion to and from each analyzer 106, 108, 110. The operation of each analyzer 106, 108, 110 for carrying out the various types of testing (e.g., assay or clinical chemistry) may be carried out by a local workstation computer at each analyzer 106, 108, 110 that is in digital communication with computer 143, such as through a network 149 (FIG. 1) such as a local area network (LAN) or wireless area network (WAN) or other suitable communication network. Optionally, the operation of some or all of the afore-mentioned analyzers 106, 108, 110 may be provided by computer 143.

For all but the quality check module 130, the computer 143 may control the automated diagnostic analysis system 100 according to software, firmware, and/or hardware commands or circuits such as those used on the Dimension® clinical chemistry analyzer sold by Siemens Healthcare Diagnostics Inc. of Tarrytown, New York, and such control is typical to those skilled in the art of computer-based electromechanical control programming and will not be further described herein. Other suitable systems for controlling the automated diagnostic analysis system 100 may be used. The control of the quality check module 130 may also be provided by the computer 143, but in accordance with the inventive characterization methods described in detail herein.

The computer 143 can be used for image processing and to carry out the characterization methods described herein. The computer may include a CPU or GPU, sufficient processing capability and RAM, and suitable storage. In one example, the computer 143 may be a multi-processor-equipped PC with one or more GPUs, 8 GB Ram or more, and a Terabyte or more of storage. In another example, the computer 143 may be a GPU-equipped PC, or optionally a CPU-equipped PC operated in a parallelized mode. A Math Kernel Library (MKL) could be used as well, 8 GB RAM or more, and suitable storage.

Embodiments of the disclosure may be implemented using a computer interface module (CIM) 145 that allows a user too easily and quickly access a variety of control and status display screens. These control and status display screens may display and enable control of some or all aspects of a plurality of interrelated automated devices used for preparation, pre-screening, and analysis of specimens 212. The CIM 145 may be employed to provide information about the operational status of a plurality of interrelated automated devices as well as information describing the location of any specimen 212 and a status of pre-screening and test(s) to be performed on, or being performed on, the specimen 212. The CIM 145 is thus adapted to facilitate interactions between an operator and the automated diagnostic analysis system 100. The CIM 145 may include a display screen operative to display a menu including icons, scroll bars, boxes, and buttons through which the operator may interface with the automated diagnostic analysis system 100. The menu may comprise a number of functional elements programmed to display and/or operate functional aspects of the automated diagnostic analysis system 100.

Figures 4A, 4B:
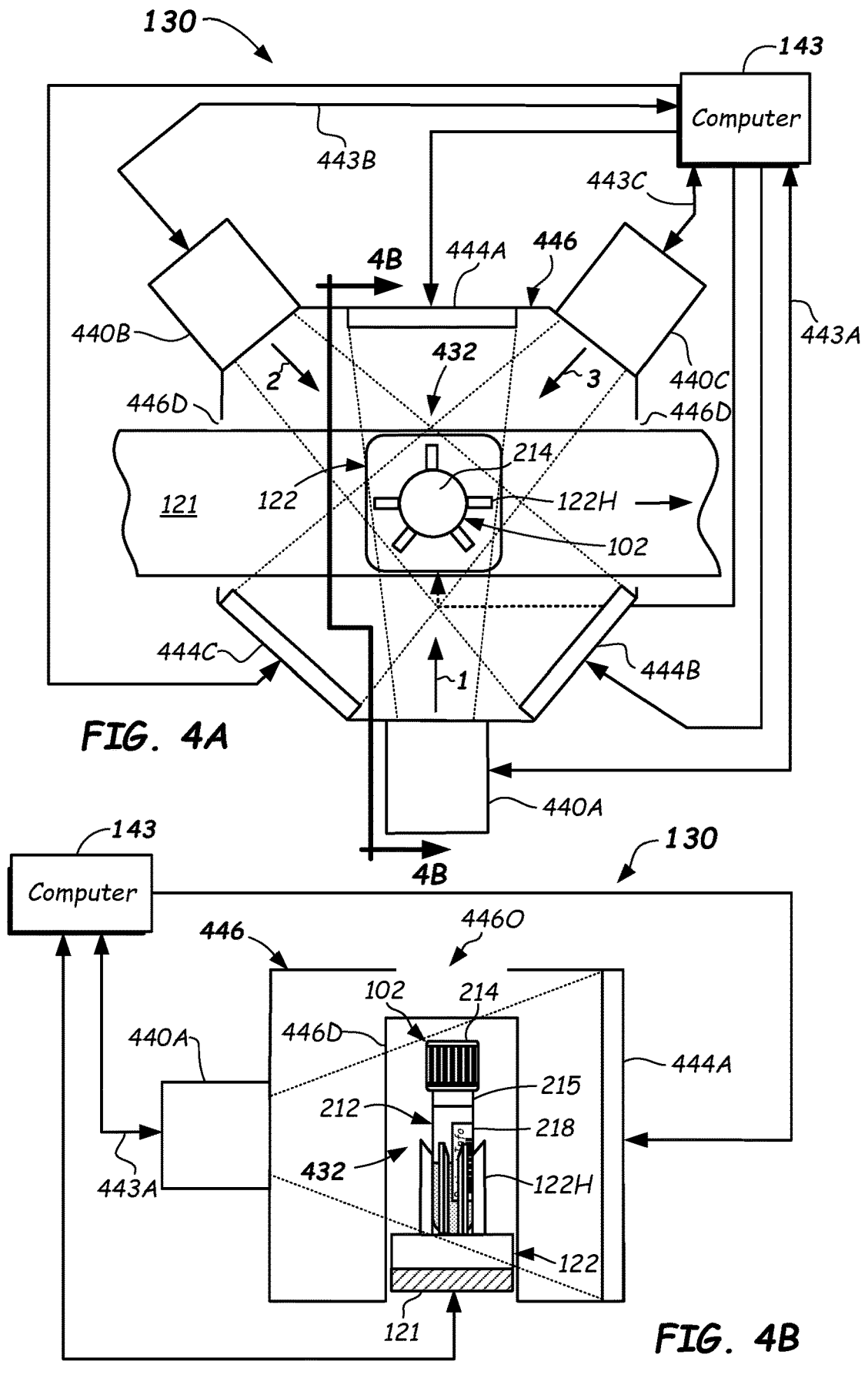
FIG. 4A illustrates a schematic top view of a quality check module (with top removed) including multiple viewpoints and configured to capture and analyze multiple images to enable a segmentation and/or an HILN determination according to one or more embodiments.
FIG. 4B illustrates a schematic side view of the quality check module (with front enclosure wall removed) of FIG. 4A taken along section line 4B-4B of FIG. 4A according to one or more embodiments.

FIGS. 4A and 4B show an embodiment of a quality check module 130 configured to carry out the characterization methods as shown and described herein. Quality check module 130 may be configured with programming instructions to pre-screen for a presence of, and optionally, a degree of, an interferent (e.g., H, I, and/or L) in a specimen 212 (e.g., in a serum or plasma portion 212SP thereof) prior to analysis by one or more of the one or more analyzers 106, 108, 110. Pre-screening in this manner allows for additional processing, additional quantification or characterization, and/or discarding and/or redrawing of a specimen 212 without wasting valuable analyzer resources or possibly having the presence of an interferent affect the veracity of the test results. Further, pre-screening may, in some aspects, enable improved characterization of future specimens 212.

In addition to the interferent detection methods described herein, other detection methods may take place on the specimen 212 contained in the specimen container 102 at the quality check module 130. For example, a method may be carried out at the quality check module 130 to provide segmentation data. The segmentation data may be used in a post-imaging step to quantify the specimen 212, e.g., to determine certain physical dimensional characteristics of the specimen 212, such as the locations of LA and/or SB, and/or a determination of HSP, HSB, HT, Wi, and/or HTOT. Quantification may also involve estimating, e.g., a volume of the serum or plasma portion (VSP) and/or a volume of the settled blood portion (VSB) based upon quantification of the inner width Wi. Furthermore, the quality check module 130 may be used to quantify geometry of the specimen container 102, i.e., quantify certain physical dimensional characteristics of the specimen container 102, such as the location of TC, HT, and/or W or Wi of the specimen container 102. Other quantifiable geometrical features may also be determined.

Quality check module 130 may include a housing 446 that may at least partially surround or cover the track 121 to minimize outside lighting influences. The specimen container 102 may be located inside the housing 446 at an imaging location during the image-taking sequences. Housing 446 may include one or more doors 446D to allow the carriers 122 to enter into and/or exit from the housing 446. In some embodiments, the ceiling may include an opening 446O to allow a specimen container 102 to be loaded into the carrier 122 by a robot including moveable robot fingers from above.

As shown in FIGS. 4A and 4B, quality check module 130 may include multiple image capture devices 440A-440O configured to capture lateral images of the specimen container 102 and specimen 212 at an imaging location 432 from multiple viewpoints (e.g., lateral viewpoints labeled 1, 2, and 3). While three image capture devices 440A-440O are shown, optionally two, four, or more can be used. The viewpoints 1-3 may be arranged so that they are approximately equally spaced from one another, such as about 120° radially from one another, as shown. The images may be taken in a round robin fashion, for example, where one or more images from viewpoint 1 may be taken followed sequentially by viewpoints 2 and 3. Other sequences of image taking may be used. Light sources 444A-444C may back light the specimen container 102 (as shown) for imaging to accomplish segmentation and/or HILN characterization. In other instances, such as for characterizing the specimen container 102, front lighting the imaging location 432 may be used. Multiple viewpoints are advantageous because one or more images taken from viewpoints 1-3 may be partially or fully occluded (i.e., no clear view of the serum or plasma portion 212SP) by one or more labels 218.

As depicted, the image capture devices 440A, 440B, 440C may be arranged around the track 121. Other arrangements of the plurality of image capture devices 440A, 440B, 440C may be used. In this way, the images of the specimen 212 in the specimen container 102 may be taken while the specimen container 102 is residing in the carrier 122 at the imaging location 432. The field of view of the multiple images obtained by the image capture devices 440A, 440B, 440C may overlap slightly in a circumferential extent. Thus, in some embodiments, portions of the images may be digitally added to arrive at a complete image of the serum or plasma portion 2121SP for analysis.

Image capture devices 440A-440O may be any suitable device configured to capture well-defined digital images, such as conventional digital cameras capable of capturing a pixelated image, charged coupled devices (CCD), an array of photodetectors, one or more CMOS sensors, or the like. The captured image size may be, e.g., about 2560×694 pixels, for example. In another embodiment, the image capture devices 440A, 440B, 440C may capture an image size that may be about 1280×387 pixels, for example. Other image sizes and pixel densities may be used for the captured images.

Each image may be triggered and captured at quality check module 130 in response to receiving a triggering signal provided in communication lines 443A, 443B, 443C from the computer 143. Each of the captured images may be processed by the computer 143 according to one or more embodiments. In one particularly effective method, high dynamic range (HDR) processing may be used to capture and process the image data from the captured images.

Figure 5:
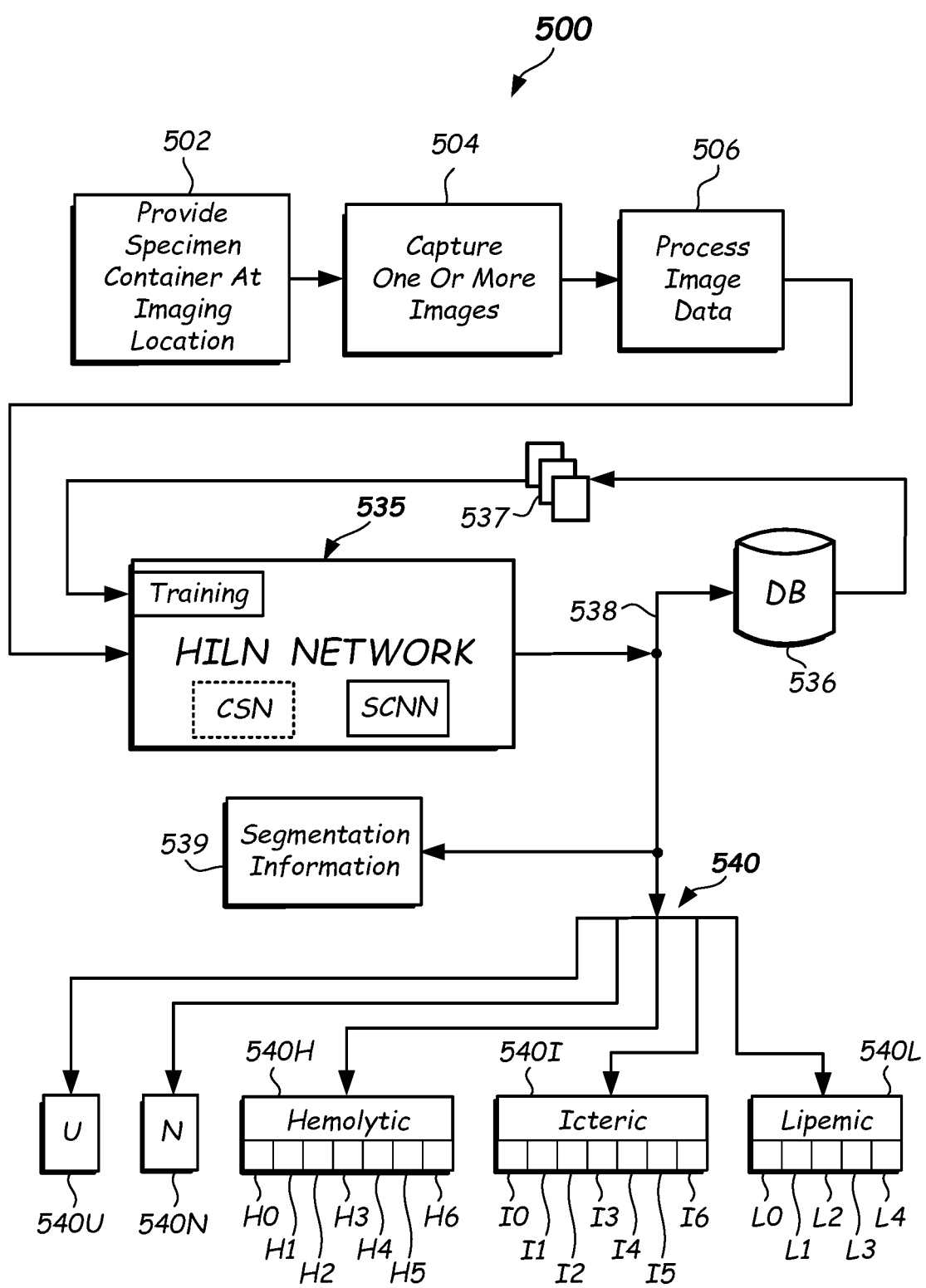
FIG. 5 illustrates a functional block diagram of an HILN network operative to perform segmentation and interferent determinations of a specimen in a specimen container while continuously providing training updates to the HILN network based on characterization performance according to one or more embodiments.

FIG. 5 shows a functional HILN network architecture 500 configured to carry out the characterization methods described herein. HILN network architecture 500 includes an HILN network 535 and a database 536 that is accessible by computer 143. In some embodiments, database 536 may be resident in memory of the computer 143. Optionally, database 536 may be a cloud-based database and may be accessible on a remote server/computer (not shown) that is separate from computer 143 via the internet, for example. HILN network architecture 500 provides feedback of training updates, such as continuous training updates 537 to the HILN network 535 via information stored in the database 536. The training updates may be stored in database 536 and may be automatically incorporated into HILN network 535 on a frequent or regular basis, or by an action of a user at the user's discretion, as described above. In some embodiments, training updates may be immediately incorporated into HILN network 535 as they are received by database 536. The training updates 537 may be forwarded to HILN network 535 (e.g., via the Internet or a physical media) for incorporation therein. The incorporation of the training updates 537 into HILN network 535 may be automatic under the control of computer 143 or optionally at a prompting at a user's discretion via CIM 145 (of FIG. 1). The HILN network 535 will be retrained with a carefully sampled mix of new and old image data. The training can happen locally or it can be trained on a remote server/cloud and then re-downloaded. The trained model can be tested on verification/validation data (e.g., that was used for regulatory approval) along with some of the newly-collected data. The HILN network 535 can generate a performance report in compliance with the regulatory process, and can highlight the improvement over previous model. Based on this report, the user can approve for an update or the HILN network 535 can get updated automatically. These training updates can occur without interrupting the existing workflow. Here the update can simply replace the old model with the new model trained on the new data. In some embodiments, the update can be performed by a service technician or it can happen remotely, such as over the internet.

HILN network architecture 500 may be implemented in a quality check module 130 and controlled by the computer 143 via programming instructions. As discussed above, the specimen container 102 may be provided at imaging location 432 (FIGS. 4A and 4B) of the quality check module 130 as represented at functional block 502. The providing the specimen container 102 at imaging location 432 may be accomplished by stopping a carrier 122 containing the specimen container 102 and specimen 212 for characterization at the imaging location 432. However, other means of placement at the imaging location 432 may be used, such as placement thereat by a robot. One or more images (e.g., Multi-viewpoint images) may be captured by the plurality of image capture devices 440A-440C as represented at functional block 504. The image data for each of the multi-viewpoint images may optionally be pre-processed and consolidated as discussed in US Pat. App. Pub. 2019/0041318 to Wissmann et al. titled "Methods And Apparatus For Imaging A Specimen Container and/or Specimen Using Multiple Exposures" to provide a plurality of optimally-exposed and normalized image data sets (hereinafter "image data sets") as represented at functional block 506. The image data (i.e., pixel data) of a captured image data sets of a specimen 212 (and specimen container 102) may be provided as input to HILN network 535 in accordance with one or more embodiments.

HILN network 535 is configured to perform segmentation and/or HILN determinations, and usually both, on captured image data of specimens 212 in specimen containers 102. Segmentation and HILN classification may be accomplished by a segmentation convolutional neural network (SCNN). Other types of HILN networks may be employed to provide segmentation and/or HILN determinations. HILN network 535, which can perform pixel-level classification, may provide a detailed characterization of a captured image of a specimen container 102 containing a specimen 212. This detailed characterization may include, e.g., separation of the specimen container 102 from its background and a determination of a location and content of the serum or plasma portion 212SP of the specimen 212. Given a captured input image (i.e., pixel data), the HILN network 535 can be operative to assign a classification index (HIL or N) to each pixel of the image based on its local appearance as indicated by its pixel data value. The extracted pixel index information can be further processed by the HILN network 535 to determine a final HILN classification index.

In some embodiments, the classification index may include multiple serum classes, including an un-centrifuged class, a normal class, and multiple classes/subclasses. In some embodiments, the classification may include 21 serum classes, including an un-centrifuged class, a normal class, and 19 HIL classes/subclasses, as described in more detail below.

One challenge to determining an appropriate HILN classification index for a specimen 212 undergoing pre-screening at the quality check module 130 may result from the small appearance differences within each sub-class of the H, I, and L classes. That is, the pixel data values of adjacent sub-classes can be very similar. To overcome these challenges, the SCNN of the HILN network 535 may include a very deep semantic segmentation network (DSSN) that includes, in some embodiments, more than 100 operational layers.

To overcome appearance differences that may be caused by variations in specimen container type (e.g., size, shape, and/or type of glass or plastic material used in the container), the HILN network 535 may also include a container segmentation network (CSN) at the front end of the DSSN. The CSN is configured and operative to determine and output container type and, which may include, e.g., a type of specimen container (indicating, e.g., height HT and width W (or diameter), and/or a type and/or color of a specimen container cap 214. In some embodiments, the CSN may have a similar network structure as the DSSN, but shallower (i.e., with far fewer layers). DSSN is configured and operative to determine and output boundary segmentation information 539, which may include locations and pixel information of, e.g., a serum or plasma portion 212SP, a settled blood portion 212SB, a gel separator (if used), an air region 216, and one or more label regions 218.

The HILN determination of a specimen characterized by the HILN network 535 may be a classification index 540 that, in some embodiments, may include an un-centrifuged class 540U, a normal class 540N, a hemolytic class 540H, an icteric class 540I, and a lipemic class 540L. In some embodiments, hemolytic class 540H may include sub-classes H0, H1, H2, H3, H4, H5, and H6. Icteric class 540I may include sub-classes I0, I1, I2, I3, I4, I5, and I6. And lipemic class 540L may include sub-classes L0, L1, L2, L3, and L4. Each of hemolytic class 540H, icteric class 540I, and/or lipemic class 540L may have, in other embodiments, other numbers of fine-grained sub-classes.

The captured images and possibly other related data of incorrect or low confidence characterization determinations 538 may be forwarded (and encrypted in some embodiments) to database 536. Any suitable algorithm or technique may be used to identify an incorrect determination and/or determine a confidence level (i.e., a prediction of the accuracy of a characterization determination). In one embodiment, the incorrect or low confidence determination is a determination that the HILN determination is incorrect or has low probability of being correct. Incorrect determination, as used herein, means that the HILN determination is improper because it involves too much error. In some cases where there is a low confidence determination of the HILN class or class index, the low confidence determination van involve using a confidence level of less than 0.9, for example. This confidence level limit may be preset by a user or determined based on regulatory requirements.

In another embodiment, the incorrect or low confidence determination is a determination that the segmentation determination is incorrect or has low confidence. In particular, the incorrect determination of the segmentation involves identification of a region, such as serum or plasma portion 212SP, gel separator, or settled blood portion 212SP that has low confidence, or that is not in a certain order with respect to each other. For example, the cap 214 is always expected to be on top of the serum or plasma portion 212SP and gel separator 313 below the serum or plasma portion 212SP. If the relative positioning is not met, then something went wrong with the segmentation. A determination of low confidence of the segmentation can involve reviewing the probability score for each segmented pixel (or collection of pixels in a superpixel—e.g., a collection of pixels, such as 11 pixels). If the probability score indicating a particular classification (e.g., serum or plasma portion 212SP) of a region of pixels has too much disagreement, then that would likely be a candidate for low confidence. The probability scores of the pixels (or superpixels) of a region that has been segmented (e.g., region classified at serum or plasma portion 212SP) can be aggregated to determine if the region pixels contain too much disagreement. In this case, the region would likely be a candidate for a low confidence sample if the confidence level is less than 0.9, for example. Other suitable aggregated confidence levels for a region can be used.

Based on the incorrect or low confidence characterization determinations, computer 143 (or a remote server/computer in those embodiments where database 536 is a cloud-based database) may generate training updates 537 (e.g., additional training images) automatically and/or in conjunction with user input. That is, in some embodiments, the training updates 537 may be based on the previous images that were deemed incorrect, and they can be manually annotated. Manual annotation of the training images 537 can involve graphically outlining at least the serum or plasma portion 212SP in the respective training image, and preferably the settled blood portion 212SB, air 216, cap 214, label 218, and gel separator (if used). Manual annotation of the training image 537 can further involve assigning an HILN classification and may also involve assigning an index value to the serum or plasma portion 212SP if H, I, or L. In other embodiments, the training updates 537 may be provided with automatically-generated annotations of the received images of specimen characterizations determined to be incorrect or of low confidence. The automatic annotation can be provided by semi-supervised approach, boot-strapping, or using a pre-trained segmentation/classification algorithm.

The training updates 537 may be provided to HILN network 535 (e.g., via the Internet or a physical media) for incorporation therein. The incorporation of the training updates 537 into HILN network 535 may be automatic under the control of computer 143 or optionally at a prompting at a user's discretion via CIM 145 (of FIG. 1). The HILN network 535 can be retrained with a carefully sampled mix of new image data and old image data. The retraining can happen locally, or it can be trained on a remote server/cloud. The retrained HILN model (e.g., SCNN) is tested on the verification/validation data that was used for regulatory approval, along with some of the newly collected image data. The system can then generate a performance report in compliance with performance criteria, such as from a regulatory process, wherein it can highlight the improvement over the previous model. Based on this performance criteria, the customer can approve the update, or the system can optionally get updated automatically. These updates can happen without interrupting the existing workflow. For example, the update can involve replacing the old SCNN model with the new SCNN model having been retrained with the new training images that had been deemed incorrect by the previous model. The update can be performed by a service technician, or it can happen remotely over the internet.

Figure 6:
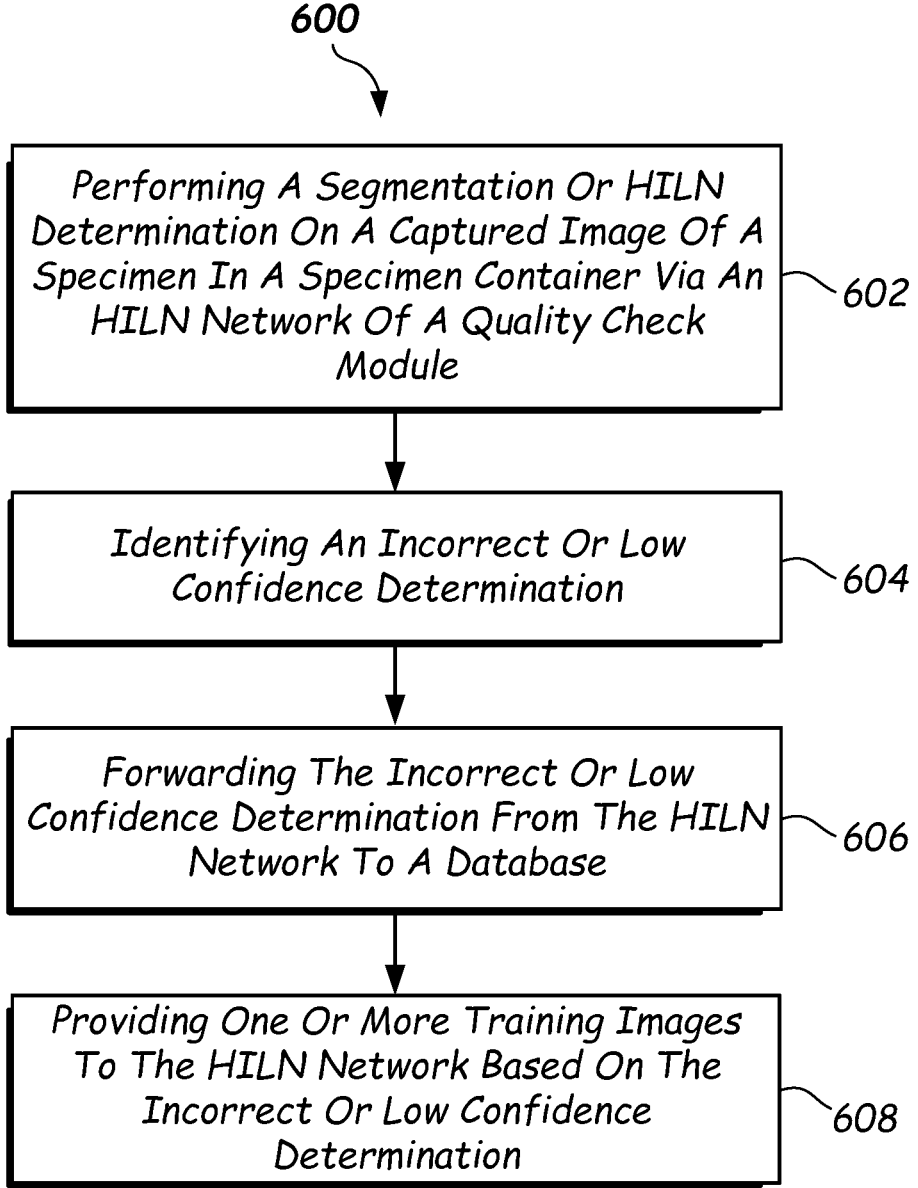
FIG. 6 illustrates a flowchart of a method of characterizing a specimen in a quality check module according to one or more embodiments.

FIG. 6 illustrates a flowchart of a characterization method 600 according to one or more embodiments. The characterization method 600 may be carried out by quality check module 130 (in conjunction with computer 143 executing programming instructions) as described herein, and may include at process block 602 performing a segmentation or an HILN (hemolytic, icteric, lipemic, normal) determination on a captured image of a specimen in a specimen container via an HILN network of a quality check module in the automated diagnostic analysis system. For example, the captured images may be captured by one or more of image capture devices 440A-440O (of FIGS. 4A and 4B) wherein each may be a digital, pixelated image, and the HILN network may be HILN network 535 (FIG. 5) of quality check module 130 (FIGS. 4A-4B) in automated diagnostic analysis system 100 (FIG. 1).

The characterization method 600 may further include, in process block 604, identifying an incorrect or low confidence determination. Any suitable technique or algorithm may be used to identify an incorrect determination or assigning and determining a low confidence level to a characterization determination of a specimen in a specimen container. For example, an incorrect determination can be based on a low confidence level score from a Softmax function of the SCNN. The low confidence can be based on a probability or confidence score of less than 0.9 on a 0.0 to 1.0 scale. In other instances, the overall classification of a segmented region (e.g., serum or plasma portion 212SP) can be reviewed and if a substantial difference exists in the classification of the pixels (or super pixels) within the region, the determination can be deemed incorrect or of low confidence. For example, if less than 70 percent of the pixels in the segmented region are of the same class, the determination can be deemed incorrect or of low confidence. In other embodiments, if less than 80 percent, or even less than 90%, of the pixels in the segmented region are of the same class, the determination can be deemed to be incorrect or of low confidence. For each high confidence, at least 90%, or even at least 95% of the pixels of the region should be classified as being the same item (e.g., classified as serum or plasma portion.

In process block 606, the characterization method 600 may include forwarding the incorrect or low confidence determination from the HILN network to a database. For example, referring to FIG. 5, an incorrect or low confidence determination 538 may be forwarded from HILN network 535 to database 536 along with the corresponding image data.

In process block 608, the characterization method 600 may include providing one or more training images to the HILN network based on the incorrect or low confidence determination. For example, as shown in FIG. 5, training images 537 may be provided to HILN network 535 for retraining of the HILN network 535 to improve the future characterization of specimens and specimen containers. Providing the one or more training images 537 to the HILN Network 535 for retraining can be as explained herein or by any other known retraining model method.

Accordingly, based on the foregoing it should be apparent that an improved characterization method 600 provides a segmentation determination and/or an HILN (hemolysis, icterus, lipemia, normal) determination of a specimen while continuously updating the characterization by retraining with training images based on the accuracy (correctness) and/or confidence level of the determinations.

As should also be apparent, the above characterization methods may be carried out using a quality check module (e.g., quality check module 130), comprising a plurality of image capture devices (e.g., image capture devices) 440A-440C arranged around an imaging location (e.g., imaging location 432), and configured to capture one or more images from one or more viewpoints (e.g., viewpoints 1-3 of FIG. 4A) of a specimen container 102 containing a specimen 212. The quality check module 130 also includes a computer (e.g., computer 143) coupled to the plurality of image capture devices and configured to process pixel data of the one or more captured images. The computer (e.g., computer 143) may also be configured and capable of being operated to provide continuous characterization training updates 537 to an HILN network 535 of the quality check module 130 based on the outputted performance of the HILN network 535.

While the disclosure is susceptible to various modifications and alternative forms, specific method and apparatus embodiments have been shown by way of example in the drawings and are described in detail herein. It should be understood, however, that the particular methods and apparatus disclosed herein are not intended to limit the disclosure but, to the contrary, to cover all modifications, equivalents, and alternatives falling within the scope of the claims.

What is claimed is:

1. A method of characterizing a specimen in an automated diagnostic analysis system, comprising:
performing, as part of a workflow for the automated diagnostic analysis system, a segmentation or an HILN (hemolytic, icteric, lipemic, normal) determination on a captured pixelated image of a specimen in a specimen container, the segmentation or the HILN determination based on pixel appearance as indicated by respective pixel data values via an HILN network of a quality check module in the automated diagnostic analysis system, wherein the HILN network includes a trained model;

identifying an incorrect or low confidence determination based on a predetermined percent or number of pixel data values in a particular segmentation or HILN determination that exceeds a predetermined limit;

forwarding the incorrect or low confidence determination from the HILN network to a database;

providing one or more training images for the HILN network based on the incorrect or low-confidence determination;

retraining the trained model with the one or more training images remotely from the automated diagnostic analysis system to generate a retrained model;

downloading the retrained model to the automated diagnostic analysis system; and updating the HILN network by replacing the trained model with the retrained model while maintaining uninterrupted the workflow of the automated diagnostic analysis system.

2. The method of claim 1, comprising providing training updates based on manually annotated and/or automatically generated annotations of the one or more training images based on the incorrect or low confidence determination.

3. The method of claim 2, comprising forwarding the training updates from the database to the HILN network for incorporation therein.

4. The method of claim 2, comprising providing a report or prompt of availability of one or more training updates to a user to allow the user to decide when and if to receive and/or incorporate the one or more training updates to retrain the HILN network.

5. The method of claim 1, wherein the HILN determination comprises determining a classification index selected from multiple classes, including an un-centrifuged class, a normal class, and HIL classes/subclasses.

6. The method of claim 1, wherein the HILN determination comprises determining a classification index selected from 21 serum classes, including an un-centrifuged class, a normal class, and 19 HIL classes/subclasses.

7. The method of claim 1, wherein the low confidence determination comprises a confidence level of less than 0.9 in a range from 0.0 to 1.0.

8. The method of claim 1, wherein the retraining of the trained model of the HILN network with the one or more training images occurs on a remote server/cloud.

9. The method of claim 1, wherein the retraining of the trained model of the HILN network occurs upon meeting or exceeding a threshold number of incorrect or low confidence determinations in the database.

10. The method of claim 1, wherein specimens having characterizations performed by the HILN network that are determined to have the incorrect or the low confidence determination are not automatically forwarded to an analyzer of the automated diagnostic analysis system, but are set aside for further review.

11. The method of claim 1, wherein the incorrect or low confidence determination is a determination that the HILN determination is incorrect or has low confidence.

12. The method of claim 11, wherein the incorrect or low confidence determination of the HILN determination involves a low confidence determination comprising a confidence level of less than 0.9 in a range from 0.0 to 1.0.

13. The method of claim 1, wherein the incorrect or low confidence determination is a determination that a segmentation determination is incorrect or has low confidence.

14. The method of claim 13, wherein the incorrect or low confidence determination of the segmentation determination involves a determination that less than 70 percent of pixels in a classified segment are classified the same.

15. The method of claim 14, wherein the incorrect or low confidence determination of the segmentation determination involves a determination that less than 80 percent of the pixels in the classified segment are classified the same.

16. The method of claim 15, wherein the incorrect or low confidence determination of the segmentation determination involves a determination that less than 90 percent of the pixels in the classified segment are classified the same.

17. The method of claim 1, wherein the one or more training images include associated annotation involving graphically outlining at least a serum or plasma portion in the one or more training images and assigning an HIL classification and index value.

18. The method of claim 17, wherein the associated annotation further comprises annotating a settled blood portion, air, cap, label, and/or gel separator.

19. The method of claim 1, wherein the one or more training images comprise automated annotation.

20. A quality check module of an automated diagnostic analysis system, comprising:

a plurality of image capture devices arranged around an imaging location configured to capture multiple pixelated images from multiple viewpoints of a specimen container; and a computer coupled to the plurality of image capture devices, the computer configured and operative via programming instructions to:

perform, as part of a workflow for the automated diagnostic analysis system, a segmentation or an HILN (hemolytic, icteric, lipemic, normal) determination on a captured pixelated image of a specimen in the specimen container, the segmentation or the HILN determination based on pixel appearance as indicated by respective pixel data values via an HILN network of the quality check module, the captured image taken by one of the plurality of image capture devices, the HILN network executing on the computer and including a trained model;

identify an incorrect or low confidence determination based on a predetermined percent or number of pixel data values in a particular segmentation or HILN determination that exceeds a predetermined limit;

forward the incorrect or low confidence determination from the HILN network to a database;

provide one or more training images for the HILN network based on the incorrect or low confidence determination;

retrain the trained model with the one or more training images remotely from the automated diagnostic analysis system to generate a retrained model;

download the retrained model to the automated diagnostic analysis system; and update the HILN network by replacing the trained model with the retrained model while maintaining uninterrupted the workflow of the automated diagnostic analysis system.

* * * * *